(12) United States Patent
Maruccia et al.

(10) Patent No.: US 8,165,120 B2
(45) Date of Patent: Apr. 24, 2012

(54) BUFFERING ARCHITECTURE FOR PACKET INJECTION AND EXTRACTION IN ON-CHIP NETWORKS

(75) Inventors: Giuseppe Maruccia, Grenoble (FR); Riccardo Locatelli, Grenoble (FR); Lorenzo Pieralisi, Seyssins (FR); Marcello Coppola, Sassenage (FR)

(73) Assignee: STMicroelectronics (Grenoble) SAS, Grenoble (FR)

( * ) Notice: Subject to any disclaimer, the term of this patent is extended or adjusted under 35 U.S.C. 154(b) by 296 days.

(21) Appl. No.: 12/291,460

(22) Filed: Nov. 10, 2008

(65) Prior Publication Data

US 2009/0147783 A1    Jun. 11, 2009

(30) Foreign Application Priority Data

Nov. 13, 2007 (EP) .................. 07120600

(51) Int. Cl.
*H04L 12/56* (2006.01)
(52) U.S. Cl. ........................ 370/389
(58) Field of Classification Search .......... 370/389, 370/392; 710/316; 714/758
See application file for complete search history.

(56) References Cited

U.S. PATENT DOCUMENTS

| 6,731,644 | B1 | 5/2004 | Epps et al. | |
| 7,631,137 | B2* | 12/2009 | Goossens et al. | 710/315 |
| 7,852,867 | B2* | 12/2010 | Tsang et al. | 370/428 |
| 2004/0111660 | A1* | 6/2004 | Kim et al. | 714/758 |
| 2005/0089033 | A1 | 4/2005 | Gupta et al. | |
| 2009/0024783 | A1* | 1/2009 | Rhim et al. | 710/316 |

FOREIGN PATENT DOCUMENTS

EP    0 772 368 A2    5/1997

OTHER PUBLICATIONS

European Search Report dated Apr. 1, 2008 in connection with European Patent Application No. EP 07 12 0600.

* cited by examiner

*Primary Examiner* — Man Phan
*Assistant Examiner* — Kevin Lee

(57) ABSTRACT

This method for transferring data through a network on chip (NoC) between a first electronic device and a second electronic device, comprising:

retrieving from the first device request packets comprising request control data for controlling data transfer and actual request data to be transferred;

storing said request control and data to be transferred in memory means provided in an network interface (NI); and elaborating data packets to be transferred to the second device through said network, said data packets comprising a header and a payload elaborated from said control data and said actual data, respectively;

The control data and the actual data to be transferred are stored in separate first and second memory means.

20 Claims, 3 Drawing Sheets

BUFFERING ARCHITECTURE FOR PACKET INJECTION AND EXTRACTION IN ON-CHIP NETWORKS

CROSS-REFERENCE TO RELATED APPLICATIONS

The present application is related to European Patent Application No. 07 120 600.7, filed Nov. 13, 2007, entitled "BUFFERING ARCHITECTURE FOR PACKET INJECTION AND EXTRACTION IN ON-CHIP NETWORKS". European Patent Application No. 07 120 600.7 is assigned to the assignee of the present application and is hereby incorporated by reference into the present disclosure as if fully set forth herein. The present application hereby claims priority under 35 U.S.C. §119(a) to European Patent Application No. 07 120 600.7.

TECHNICAL FIELD

The disclosure relates, in general, to on-chip communication architectures and is in particular directed to the transmission of data from a source electronic device to a destination electronic device belonging to separate interconnection systems such as on-chip communication architectures.

BACKGROUND

For example, generally speaking, the disclosure is thus directed to the communication of data through a so-called network-on-chip system between electronic devices each connected to an on-chip bus.

As a matter of fact, researchers have recently proposed the network-on-chip concept (NoC) to overcome the limitations relating to the huge efforts necessary to adequately design on-chip communication systems.

NoC aims at providing scalable and flexible communication architectures with suitable performances. NoCs are based on a packet switched communication concept and are mainly composed of three NoCs modules, namely: a router, a network interface (NI) and a link.

As concerns the data format, data transferred within a NoC are generally composed of data packets having a header and a payload. The header contains control data for controlling data transfer and is thus responsible for carrying all the information required for performing communication, whereas the payload contains the actual information to be transmitted.

Conversely, data packets transmitted over an on-chip bus are based on specific transaction protocols. For example, the so-called "ST bus" developed by the applicant is based on a "ST bus protocol type 3" using a separate request channel and a response channel to provide communication between an initiator module and a target module.

On on-chip buses, data packets may be transmitted using two separate channels, namely a first channel provided to transfer control data and a second channel provided to transfer actual data to be used by the destination target.

To provide communication, conversion of data should be carried out when data are transferred through a NoC between electronic devices connected to an on-chip bus.

Usually, network interfaces are in particular provided to connect communicating blocks of an integrated circuit to the network and between the on-chip bus and the NoC in order to convert data from one format to another.

For data conversion, the network interfaces are each provided with a memory means in which are stored the packets produced by the network interface before injection in the NoC, the stored packets having a header, comprising control data used to control transfer of data, and a payload, comprising data to be transferred. For example a payload is present in request packets when a store operation is performed Packet injection is then realized from data stored in the memory means.

According to the type of transaction required, for example, read, write, store, . . . , the payload may have a varying size. The size of the header is generally constant. In addition, depending on the type of transaction, a packet may be deprived of payload.

Beside, when injected within a network-on-chip, the packet is cut into flow control units (flits), namely basic logic units that can be transmitted over a channel in a network-on-chip.

Two constraints may thus be considered. The first one is related to the data bus size of the electronic device connected to the network interface, whereas the other one is related to the flit size univocally fixed inside the NoC.

Consequently, the size of the memory means word may be determined as a function of the data bus size and of the flit size, the size of each word in the memory being equivalent to the maximum between the data bus size and the flit size.

For data conversion, the packet header data are first stored in the memory means, the payload of the packet, when present, being stored in the memory means, at a successive address.

This arrangement may lead to a large latency for data storage and recovery and to a large amount of memory necessary to store the header and payload.

As a matter of fact, when the memory means are arranged in the form of rows and columns of memory addresses to realize a possible size conversion towards the flit size used inside the NoC, the header and payload are stored in successive address columns in order to avoid flits containing possibly a mix of header and payload.

When the memory word size is bigger than the header, if, after having stored the header, a column is not full, the payload is stored in another address column. Accordingly, latency is increased and the storage and recovery of data requires access to an increased amount of address columns, leading to a waste of memory.

Conversely, if the memory word size is smaller than the header, different parts of the header are stored in different columns in successive clock pulses, leading to an increase of the latency.

SUMMARY

In view of the foregoing, it is hereby proposed, according to one approach, a method for transferring data through a network on chip (NoC) between a first electronic device and a second electronic device, comprising:
  retrieving from the first device request packets comprising request control data for controlling data transfer and actual request data to be transferred;
  storing said request control and data to be transferred in memory means provided in an network interface; and
  elaborating data packets to be transferred to the second device through said network, said data packets comprising a header and a payload elaborated from said control data and said actual data, respectively.

According to a general feature of this method, the control data and the actual data to be transferred are stored in separate first and second memory means.

Accordingly, control data and data to be transferred to the second device can be written simultaneously in a same clock pulse, thus avoiding latency to write and read said data in the memory means, permitting in addition to improve the storage capacity of the memory means.

In reply to the request packet emitted by the first device, the second device may comprise in addition the steps of:

retrieving response packets from the second device through said network, said response packets containing response control data for controlling data transfer and actual response data to be transferred;

storing said control data and said response data to be transferred in separate third and fourth memory means, respectively; and elaborating response data packets to be transferred to the first device, said response data packets comprising a header and payload elaborated from said response control data and said actual response data, respectively.

According to another feature, the control data stored in said first or third memory means comprise a packet header data.

In addition, in one embodiment, actual data to be transferred stored in said second or fourth memory means comprise a packet payload data.

According to yet another feature of the proposed method, a first flag is set in the first or third memory means for each packet header data indicating whether a corresponding packet payload data is stored in the second memory means.

A second flag may be set in the second or fourth memory means for each packet payload data indicating whether the payload is an end of packet payload.

According to yet another feature, data are transferred between the first and second electronic devices through an on-Chip bus and through a Network-on-Chip.

According to another aspect, it is in addition proposed a device for transferring data between a first electronic device and a second electronic device, comprising:

a first stage for retrieving from the first device request packets comprising request control data for controlling data transfer and actual request data to be transferred;

storage means for storing said request control data and actual data to be transferred; and a second stage for injecting in said network packets to be transferred to the second device;

The memory means may comprise first and second memory means for separately storing said control data and said actual data to be transferred.

The device may in addition comprise a third stage for retrieving from said network response packets containing response control data for controlling response data transfer and actual response data to be transferred to the first device, separate third and fourth memory means for storing said response control and said actual response data, respectively, and a fourth stage for generating data to be transferred to the first device.

For example, the first and third memory means comprise first and third memories, respectively, for storing a packet header data used to elaborate a header for a data packet.

The second and fourth memory means may comprise second and fourth memories for storing a packet payload data used to elaborate a payload for a data packet. For example, the first to fourth memories are each a FIFO.

According to another feature of the device, it further comprises in addition a synchronization block for synchronizing said first and second stages.

According to a further aspect, it is in addition proposed a network interface for connecting a Network-on-Chip and an On-Chip bus, comprising a device as defined above and an electronic equipment comprising a chip having a network-on-chip and a network interface for transferring data from a first electronic device to a second electronic device, wherein said network interface comprises a device as defined above.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
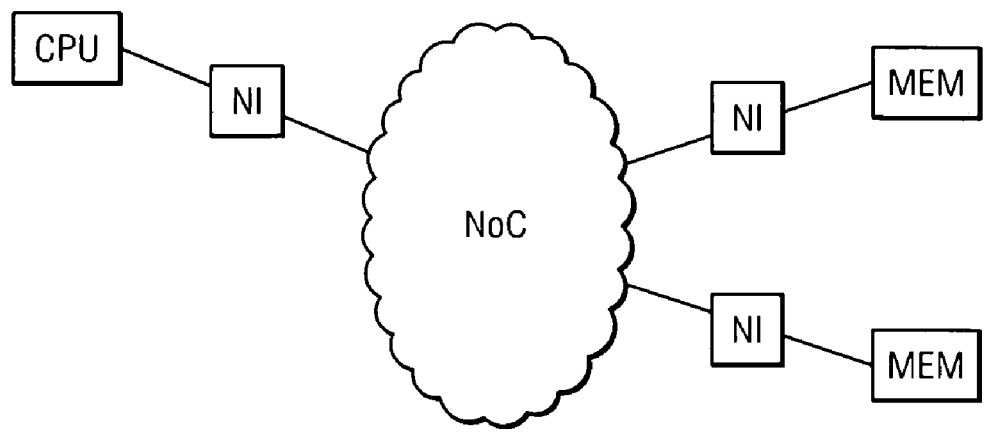
FIG. 1 illustrates the general context of the method and device for transferring data between the first and second electronic devices.

Reference is made to FIG. 1, showing an overview of a NoC used to connect together communicating elements.

In the illustrated embodiment, NoC provides a communication between electronic devices.

NoC is thus an interconnection network providing efficient means to manage communication among the communicating elements and permits in addition to provide access to said elements from outside elements, such as Central Possessing Unit (CPU), Memory (Mem), subsystems, . . . .

As illustrated, access to the NoC is made through network interfaces NI which support security for the communication system, by filtering requests to access the network at requested address.

The network interface NI is intended to provide communication between two separate interconnect systems namely, in the illustrated example, a network-on-chip and an on-chip bus.

Figure 2:
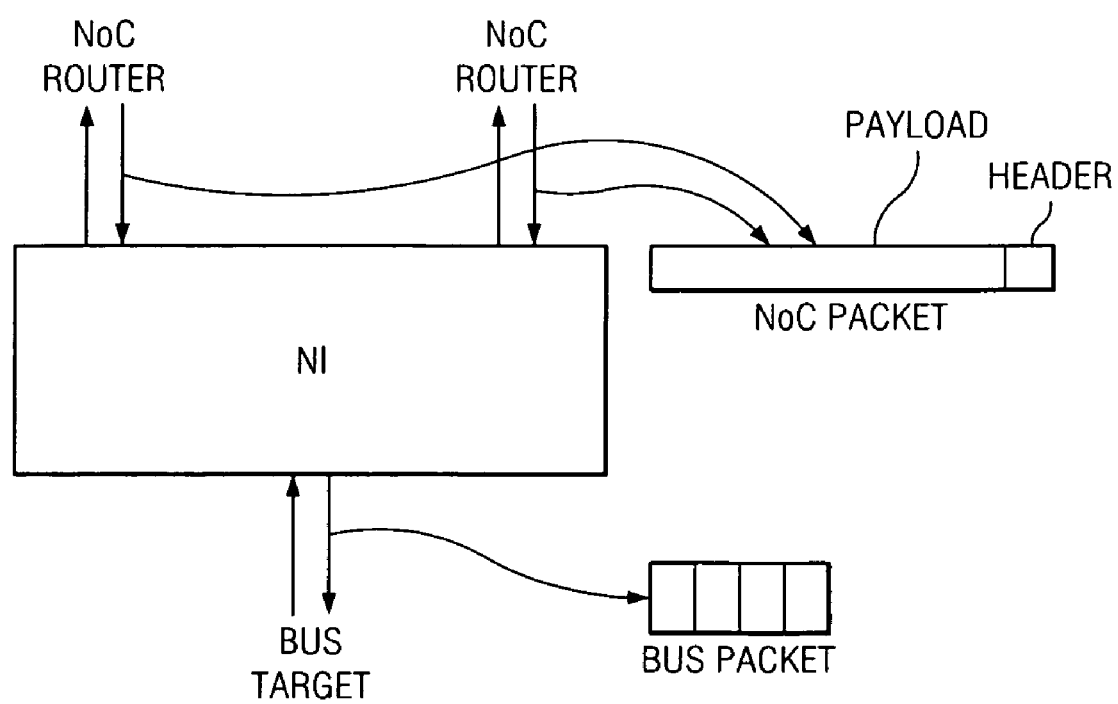
FIG. 2 shows schematically the architecture of a network interface implemented to provide communication between a network-on-chip and an on-chip-bus.

Referring to FIG. 2, this network interface is used as enter and exit point of the NoC, to transfer data from a source electronic device to a destination electronic device connected to the NI through a on-chip bus or, generally speaking, to transfer data through the NoC.

However, it should be noted that the network interface can be used to allow communication between other types of interconnection systems and, in particular, it can be used with other on-chip protocols, namely the so-called AMBA, AXI, OCP, . . . protocols.

As it is known, data transmitted through the network on-chip and through the on-chip bus have differing formats, the NI being responsible for adapting the data from one format to another.

As a matter of fact, network on-chip is a communication architecture for systems on-chip, usually based on the concept of packet switching rather than circuit switching.

In on-chip bus, data are transmitted in the form of packets consisting in a set of cells that are not interruptible. For example, as indicated above, one channel may be used to transmit control data, another channel being provided to transfer the actual data to be transmitted. In a NoC context, the packets are split into basic units called flits (Flow Control Units), and comprise a payload containing actual information to be transmitted and a header containing the control data and responsible for carrying all the information required for performing communication.

The network interface is thus intended to realize a conversion of packets according to the protocol supported by the on-chip bus into packets having the structure corresponding to the network on-chip concept. In addition, the network interface is intended to convert packets issued from the NoC into packets corresponding to the on-chip bus.

Figure 3:
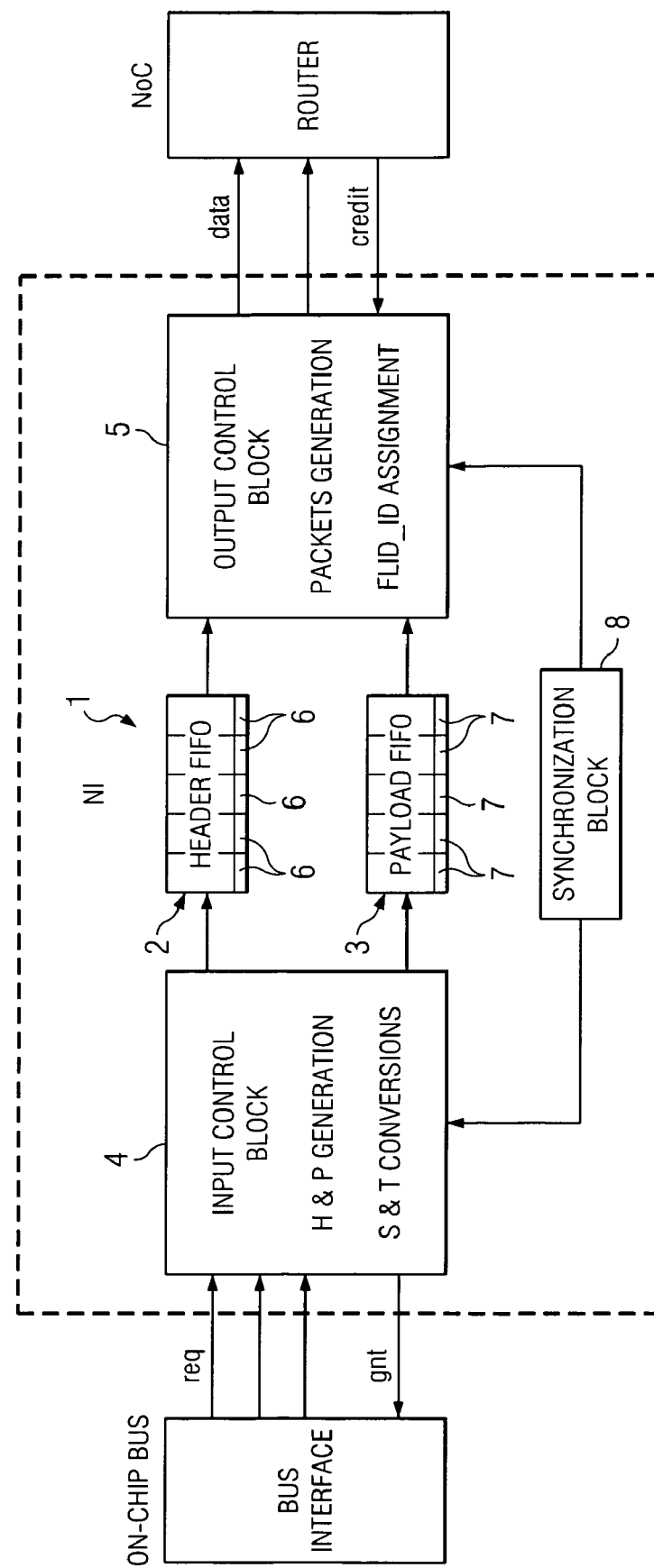
FIG. 3 illustrates the generic architecture of the network interface of FIG. 2, showing in particular the request path of the NI for accessing the first electronic device to retrieve request transaction.
Figure 4:
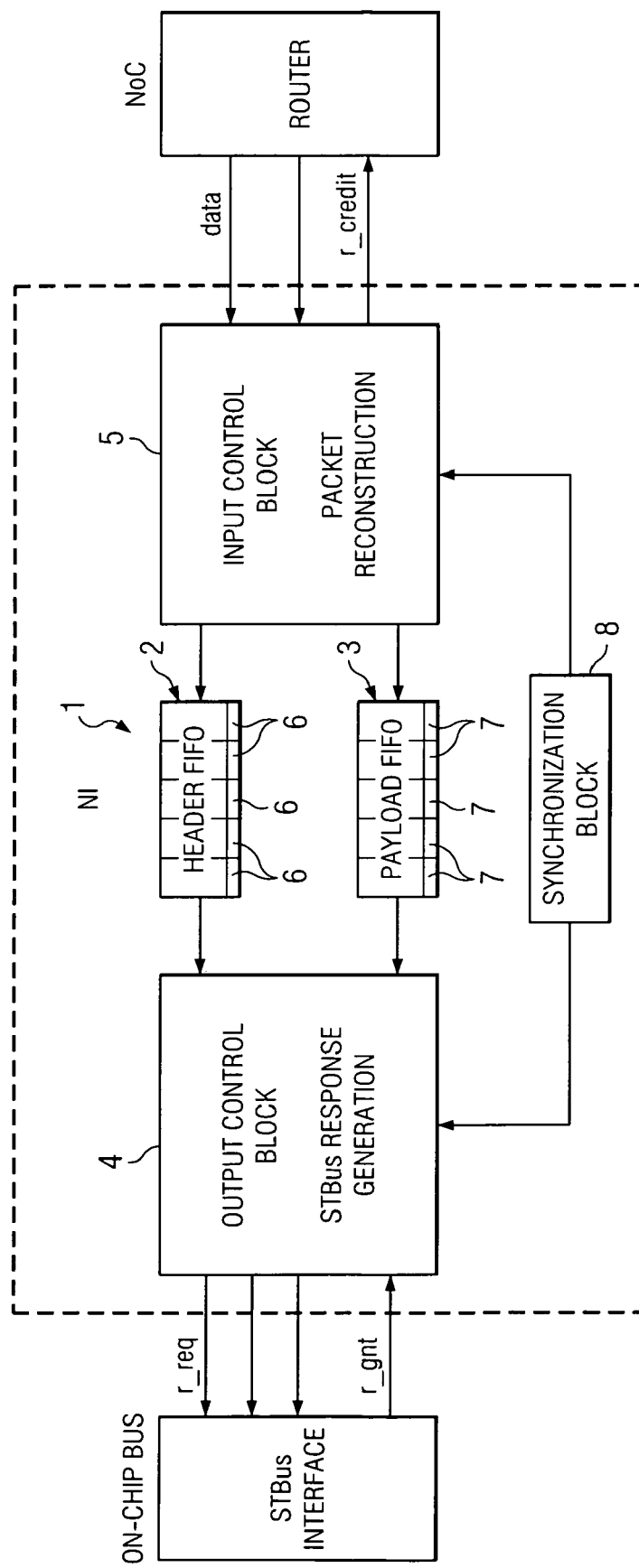
FIG. 4 illustrates the generic architecture of the network interface of FIG. 2, showing in particular the response path of the NI used to forward to the first device, response packet generated by the second electronic device in reply to the request.

Reference is now made to FIGS. 3 and 4, illustrating the general architecture of the main elements of the network interface used to transmit data between electronic devices connected to an on-chip bus, through a network-on-chip.

As far as the transfer of data is concerned, and in particular data conversion, the network interface comprises two stages having a substantially symmetrical structure illustrated respectively in FIGS. 3 and 4, in which identical elements are denoted by the same references.

FIG. 3 illustrates a path of a request transmitted from a first device to access a second device to proceed with an operation such as read, store . . . FIG. 4 concerns a path of a response transmitted from the second device to the first device in reply to the request previously transmitted.

For example, the first device is a CPU (central processing unit) and the second device is a memory.

As illustrated, communication between the on-chip bus and the network interface may be based on a so-called request and grant process in which grant signals gnt are transmitted to the on-chip bus in reply to a request req to allow reception of data.

Beside, process used to transfer data between the network interface and the network-on-chip may be based on a credit based control process, in which "credits" are transmitted to the NI, said credits corresponding to a quantity of data that the NI is authorized to transmit. Upon receipt, the NI can transmit data to the NoC for so long as the credits last.

In both paths, conversion of data requires storage of data retrieved from the NI in memory means 1 for storing control data used to control data transfer and the actual data to be transferred.

According to the embodiment illustrated in FIGS. 3 and 4, storage means 1 comprise two memories 2 and 3.

For example, the memories 2 and 3 consist each in a first-in first-out memory (FIFO).

The first FIFO 2 is used to store packet header data for packets transferred in the network-on-chip, whereas FIFO 3 is used to store a packet payload data for the packets injected in the NoC.

According to the request path, initiator transaction requests issued from the source electronic device to access the destination electronic device are retrieved by the network interface and are stored in the header FIFO 2 and payload FIFO 3, such that control data are stored in the header FIFO 2, whereas actual data to be transferred are stored in the payload FIFO 3.

However, it should be noted that data retrieved from a transaction issued from the on-chip bus are stored in the FIFO 2 and 3 in a packet shape. The saved packets are then forwarded to the NoC, split into flits.

As illustrated in FIG. 4, illustrating a response path, namely the flow of data in the NI in reply to a request issued from the on-chip bus (FIG. 3), packets split into flits issued from the network-on-chip and received by the network interface are stored in the FIFOS. After packet reconstruction, according to the on-chip bus protocol, data are transferred to the on-chip bus.

In view of the foregoing, the network interface comprises, for each request and response path, a first control block 4 and a second control block.

As far as the request path is concerned, the first control block is directly interfaced with the on-chip bus and is used to receive request transactions issued from the on-chip bus to generate the control signals, address and write requests to payload and header FIFO.

The second control block 5 is interfaced with the NoC and is used to pops the packets saved in the header and payload FIFOs and send them over the network-on-chip according to the NoC packets format.

As far as the response path is concerned, the second block 5 is used to extract packets from the NoC, store them in the dual FIFO system, said packets being then converted into the on-chip bus format and then injected in the on-chip bus by the first block 4.

It should be noted that the size of the header FIFO corresponds to that of the header.

As concerns the payload FIFO, the size of this memory corresponds to the maximum of the bit size of the network-on-chip bus and that of the flit size.

At each clock pulse, the memory data are stored in the header FIFO 2 and, simultaneously, in the payload FIFO 3.

It should also be noted that the header FIFO 2 and the payload FIFO 3 are arranged in the form of a set of rows and columns of memory addresses.

For each column of the header FIFO, a first flag 6 is set for each header, this flag 6 indicating whether a corresponding packet payload is stored in the payload FIFO 4.

In addition, for each column of the payload FIFO 4, a second flag 7 is stored, indicating whether the payload is an end of packet payload.

Consequently, the number and the correct order of header and payload flits can be obtained to each column inside the header and payload FIFO. The output control block, namely either the block 5 of FIG. 3 and block 4 of FIG. 4, is then capable to inject/extract in the correct order the flits belonging to packets previously saved in the FIFO system by the input control block.

As a matter of fact, some packets fail to comprise a payload. In particular, the payload is present only in request packets and not in response packets when storing operations are performed, while it is present only in response packets and not in request packets when load operations are performed.

In addition, packets may have different sizes.

When the source target produces a LOAD request, the corresponding packet will not have a payload. Then, the request input block will produce a packet made of a HEADER only and will set to one the flag 6 corresponding to the column of the header FIFO, where the load packet has been stored. In case of the initiator instead produces a STORE request, the corresponding packet will have a payload associated that, depending on the store size, will occupy a certain number of payload FIFO words. In this case, the request input block will not set the flag in the header FIFO column, where the packet header has been stored, but it will set the flag in the payload FIFO column corresponding to the last packet token.

As previously indicated, the size of the header FIFO word may be equal to that of the header. Conversely, the size of the payload FIFO word is determined as a function of the size of the on-chip bus and that of the flits.

The network interface is in addition able to deal with upsize and downsize conversion when the flit size chosen is not directly compatible with the on-chip bus.

Thus, in the payload FIFO, if needed, a type of size conversion may be used, such as a down size conversion, when the flit size is narrower than the on-chip bus size, and an upsize conversion, when the on-chip bus size is narrower than the flit size.

It should be noted that the control blocks 4 and 5 may operate at the difference frequency. Accordingly, synchronization block 8 is in addition provided between the two control blocks, one writing and the second reading, in order to avoid metastability problems in exchanging the signals used by the controller to evaluate correctly the FIFO status, namely full and empty.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for transferring data through a network on chip (NoC) between a first electronic device and a second electronic device, comprising:
    retrieving from the first electronic device at least some request packets comprising a request control data for controlling a data transfer and an actual data to be transferred;
    storing the request control data and the actual data to be transferred in a memory provided in an network interface (NI); and
    creating data packets to be transferred to the second device through said network, said data packets comprising a header and a payload created from the request control data and the actual data, wherein the request control data and the actual data to be transferred are stored in a separate first memory and a second memory, and wherein a first flag is set for the header to indicate whether a corresponding packet payload data is stored in the second memory.

2. The method according to claim 1, comprising:
    retrieving response packets from the second electronic device through the network, the response packets containing response control data for controlling data transfer and actual response data to be transferred;
    storing the control data and the response data to be transferred in separate third and fourth memory, respectively; and
    creating response data packets to be transferred to the first device, the response data packets comprising a header and payload created from the response control data and the actual response data.

3. The method according to claim 2, wherein control data stored in the first or third memory comprises a packet header data.

4. The method according to claim 3, wherein the actual response data to be transferred stored in said second or fourth memory comprises a packet payload data.

5. The method according to claim 1, further comprising setting a second flag in a second or fourth memory means for each packet payload data indicating whether the payload is an end of packet payload.

6. The method according to claim 1, wherein data are transferred between the first and second device through an on-Chip bus and through the network on chip.

7. A device for transferring data between a first electronic device and a second electronic device trough a network on chip, comprising:
    a first stage configured to retrieve from the first device request packets comprising request control data configured to control data transfer and actual request data to be transferred;
    a storage configured to store the request control data and actual data to be transferred; and
    a second stage configured to store network packets to be transferred to the second device;
    wherein the storage comprises a first memory configured to store the control data and a first flag configured to indicate whether a corresponding actual data is stored in a second memory and the second memory configured to store the actual data to be transferred.

8. The device according to claim 7, further comprising a third stage configured to retrieve from the network at least some response packets containing response control data configured to control response data transfer and actual response data to be transferred to the first device, a separate third and a separate fourth memory configured to store the response control and said actual response data, and a fourth stage configured to generate data to be transferred to the first device.

9. The device according to claim 8, wherein at least one of the first memory and the third memory are configured to store a packet header data used to create a header for a data packet.

10. The device according to claim 8, wherein the second and the fourth memory are configured to store the actual data used to create a payload for a data packet.

11. The device according to claim 9, wherein the first and third memories are each a FIFO.

12. The device according to claim 7, comprising a synchronization block configured to synchronize the first and second stages.

13. The device according to claim 7, further comprising a network interface configured to connect the network on chip and an On-Chip bus.

14. The device according to claim 7, further comprising a chip having a network-on-chip and a network interface configured to transfer data from the first electronic device to the second electronic device.

15. The method according to claim 2, wherein the at least some control data is stored in the first memory and comprises at least some packet header data.

16. The device according to claim 8, wherein the first memory and third memory store at least some packet header data used to create a header for a data packet.

17. The device according to claim 10, wherein the second memory and the fourth memory are each a FIFO.

18. The method according to claim 2, wherein data are transferred between the first and second device through an on-Chip bus and through a Network-on-Chip.

19. The method according to claim 3, wherein the control data is transferred between the first device and the second device through an on-Chip bus and through a Network-on-Chip.

20. The method according to claim 1, further comprising resizing a size of the actual data.

* * * * *